Figure 1:
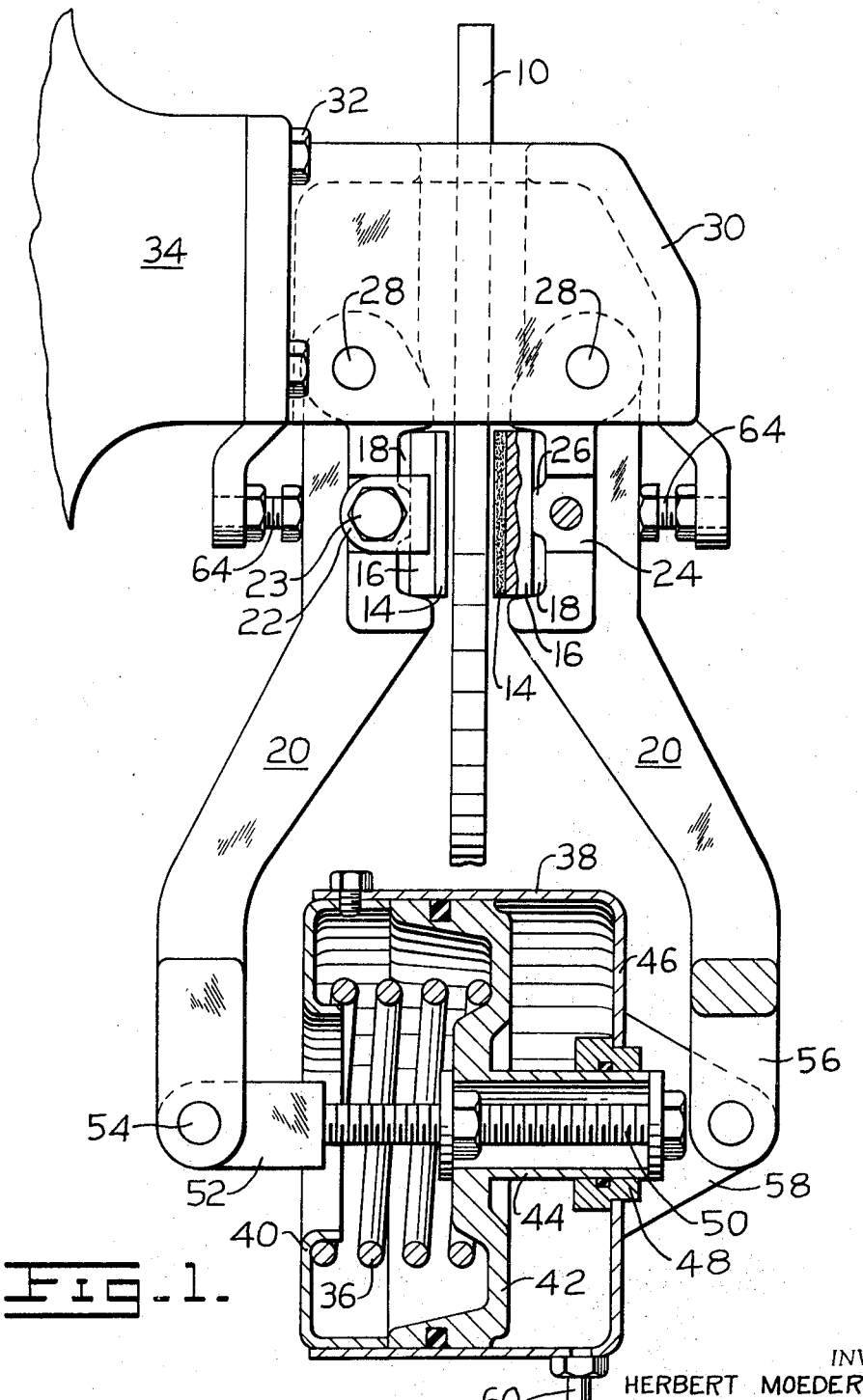

United States Patent
Moederndorfer et al.

[15] 3,661,234
[45] May 9, 1972

[54] DISC BRAKE
[72] Inventors: Herbert Moederndorfer; George E. Schubert, both of Aurora, Ill.
[73] Assignee: Caterpillar Tractor Co., Peoria, Ill.
[22] Filed: May 22, 1969
[21] Appl. No.: 826,802

[52] U.S. Cl. ................................. 188/170, 188/72.3
[51] Int. Cl. ........................................... F16d 65/24
[58] Field of Search ............... 188/72.3, 72.9, 59, 170, 171, 188/173

[56] References Cited

UNITED STATES PATENTS 2,382,552  8/1945  Eksergian et al. ................ 188/59
2,481,127  9/1949  Ledwinka .......................... 188/59
3,465,850  9/1969  Sexton .......................... 188/170 X

FOREIGN PATENTS OR APPLICATIONS 1,017,561  1/1966  Great Britain ..................... 188/171

Primary Examiner—Duane A. Reger
Attorney—Fryer, Tjensvold, Feix, Phillips & Lempio

[57] ABSTRACT

A disc brake of the type in which friction pads or small friction surfaces are carried on opposite sides of the disc which rotates with a vehicle wheel or other rotatable part of the vehicle. The friction pads are spring urged into contact with the disc to retard or stop the vehicle and are normally held out of contact with the disc by fluid pressure.

4 Claims, 2 Drawing Figures

INVENTORS
HERBERT MOEDERNDORFER
GEORGE E. SCHUBERT

DISC BRAKE

The conventional shoe and drum type parking and emergency brake has several disadvantages, one being that of heat build-up during braking which causes brakes to fade. Another problem is that such brakes are generally mechanically actuated and applied manually by an operator. Generally, such brakes do not meet specifications of some states which require a safety brake having the capacity to stop a fully loaded vehicle in emergency situations when the primary brakes have failed. The present invention provides braking means which overcome the above mentioned disadvantages and provide a brake that is applied by spring means and disengaged with fluid under pressure to overcome the spring means; thus, giving an emergency type of operation. Another advantage is that the brake has a self-centering feature which automatically causes application of braking pressure equally to opposite sides of the disc. A more complete understanding of the mentioned will be had upon reading of the following specification wherein reference is made to the accompanying drawings.

Figure 2:
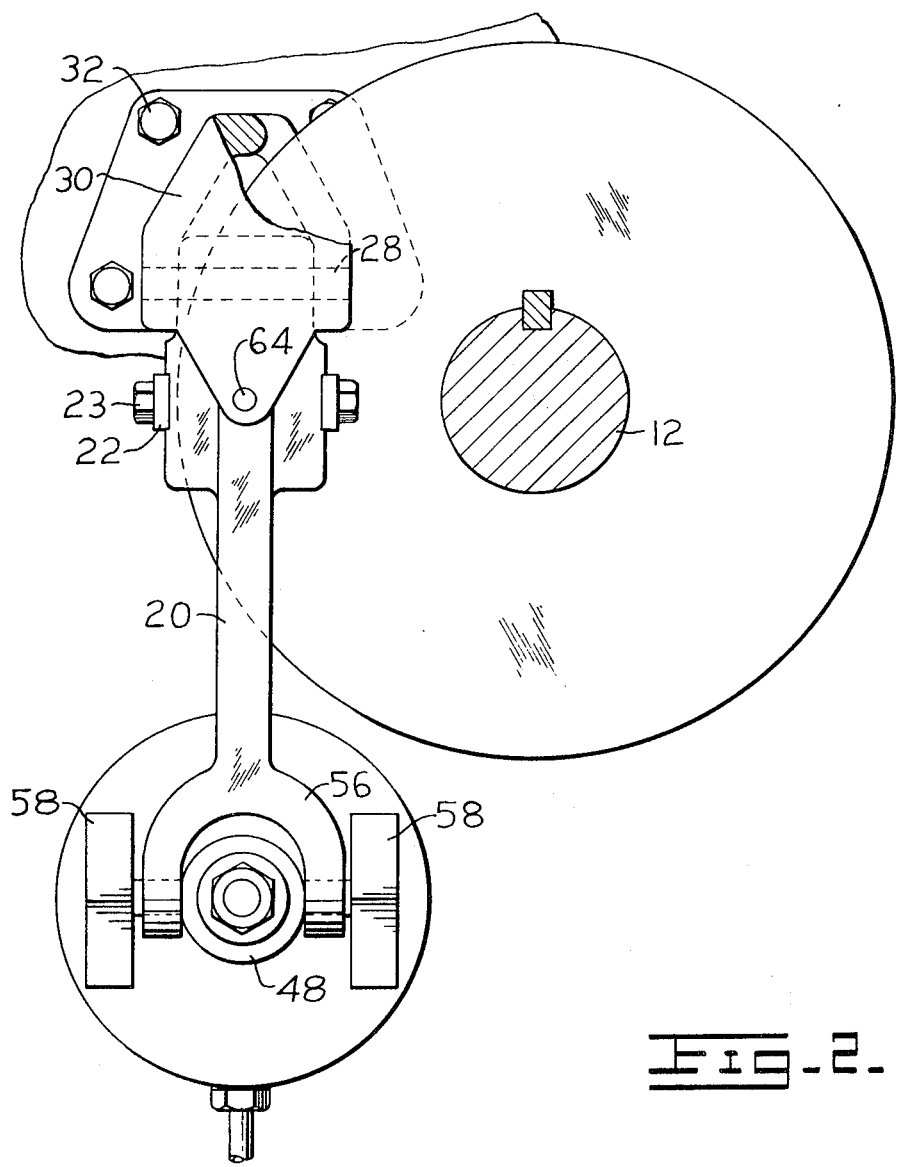

In the drawings:

FIG. 1 is a view in front elevation with parts in section of disc brake mechanism embodying the present invention; and FIG. 2 is a view in side elevation of the same mechanism as viewed from the right side of FIG. 1 and with parts in section.

In the drawings, a brake disc 10 is shown in both views and in FIG. 2, the disc is shown as fixed to a shaft 12. This shaft may be any part of the drive train of a vehicle such, for example, as the drive shaft between the transmission and driven wheels or it may be a stub shaft projecting from the transmission itself. It is important that it be a shaft which rotates with the wheels of the vehicle so that retarding the disc will retard the speed of the vehicle. Disc brakes of the kind generally referred to herein are also sometimes interconnected directly with the wheels including front wheels which, though not driving wheels, can serve for braking purposes. Briefly, it will suffice to understand that movement of the vehicle is accompanied by rotation of the disc 10 so that braking of the disc will also apply braking force to the entire vehicle.

Braking is accomplished, as is conventional in disc type brakes, by pressing a pair of friction pads against opposite sides of the disc. Such pads are shown at 14 in FIG. 1 and each is mounted upon a metallic back 16 received in a recess 18, there being one for each of a pair of levers 20. The friction pad assemblies are held within the recesses 18 by dogs 22 and cap screws 23. These are also shown in FIG. 2 wherein the dogs are illustrated as received in recesses, one of such recesses being shown at 24 in FIG. 1 where the dog 22 has been removed. This figure also illustrates the pad as resting on a raised area 26 in the bottom of recess 16 which permits rocking of the pad so that its entire surface will readily come into frictional contact with the disc as it is moved toward the disc.

The levers 20 are pivotally connected by pins 28 within a housing 30 which housing is secured by cap screws 32 to a stationary part of the vehicle shown at 34 which might be a boss on a transmission housing or the like. The housing 30 has a recess entering from one side, as represented in dotted lines in the drawings, for receiving a part of the disc 10. Braking force is applied by a spring 36 in a cylindrical chamber 38. The spring bears against a wall 40 of the chamber and also against a piston 42 reciprocably mounted in the chamber. The piston has a rod 44 extending outwardly through a wall 46 of the same chamber and slidable through a bushing 48 which is also shown in FIG. 2. A bolt 50 extends through the piston rod and has a threaded member 52 on one of its ends which is pivotally connected as by a pin 54 to an end of one of the levers 20. The other lever 20 has a bifurcated end 56 also shown in FIG. 2 pivotally connected to bosses 58, fixed to the wall 46 of the chamber. Fluid under pressure, which may be air, is communicated to the chamber through a line 60 urging the piston 42 toward the left, as illustrated in FIG. 1, to compress spring 36 and hold the brake in its released position as disclosed.

To apply the brake, the air pressure is released and the spring urges the piston 42 toward the right. This causes movement of the member 52 toward the right drawing the levers 20 toward each other until the pads 14 attain frictional engagement with the opposite sides of the disc. When air pressure is applied to release the brake, the levers are centered by adjustable limit stops 64 so that the pads 14 do not drag on the disc when they are not performing their braking function.

One of the advantages of the present invention resides in the disposition of the actuating chamber 38 directly between the levers 20 so that, as the spring expands and moves the levers toward each other, the force applied to the pads 14 on the opposite sides of the disc is exactly the same. This is also a result of the fact that the actuating chamber has no connection with any fixed part of the vehicle but only with the pivoted levers. Thus, the braking mechanism is automatically self-centering and this self-centering feature is accomplished through simple and inexpensive structure. It is also, as previously mentioned, highly desirable that the brake is spring applied so that it is not dependent upon fluid supply lines or manual force to operate under emergency conditions.

What is claimed is:

1. A vehicle brake comprising a disc which rotates when the vehicle is in motion, a pair of friction pads disposed for engagement with opposite sides of the disc, a pivoted lever supporting each pad, said levers having spaced apart ends moveable toward each other to bring the pads into braking contact with the disc and moveable away from each other to disengage the pads from said disc, a pair of limit stop means, one for each lever, which act upon said levers to center said levers with respect to said disc when said levers are moved to said disengaged position, and actuating means disposed between and supported entirely by said levers.

2. The brake of claim 1 in which the actuating means comprises spring means for applying the brake and fluid pressure means for releasing the brake.

3. The brake means of claim 1 in which the actuating means is a cylindrical chamber with a reciprocable piston therein and the spring pressure is applied to one side of the piston and fluid pressure to the other side.

4. The brake means of claim 3 in which the piston is connected with one lever and the chamber is connected with the other.

* * * * *